(12) United States Patent
Das Gupta et al.

(10) Patent No.: US 11,494,076 B2
(45) Date of Patent: Nov. 8, 2022

(54) STORAGE-USAGE-BASED HOST/STORAGE MAPPING MANAGEMENT SYSTEM

(71) Applicant: Dell Products L.P., Round Rock, TX (US)

(72) Inventors: Arunava Das Gupta, Bangalore (IN); Chandrashekar Nelogal, Round Rock, TX (US); Niladri Bhattacharya, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 23 days.

(21) Appl. No.: 17/151,817

(22) Filed: Jan. 19, 2021

(65) Prior Publication Data

US 2022/0229553 A1     Jul. 21, 2022

(51) Int. Cl.
*G06F 3/06*     (2006.01)

(52) U.S. Cl.
CPC .......... *G06F 3/0604* (2013.01); *G06F 3/0653* (2013.01); *G06F 3/0673* (2013.01)

(58) Field of Classification Search
CPC ..... G06F 3/0604; G06F 3/0653; G06F 3/0673
See application file for complete search history.

(56) References Cited

U.S. PATENT DOCUMENTS

| | | | | |
|---|---|---|---|---|
| 9,575,668 | B1 * | 2/2017 | Martin | G11C 16/26 |
| 10,073,753 | B2 * | 9/2018 | Boyapalle | G06F 11/3409 |
| 10,108,517 | B1 * | 10/2018 | Efremov | G06F 3/067 |
| 10,437,865 | B1 * | 10/2019 | Clements | G06F 16/30 |
| 11,074,092 | B2 * | 7/2021 | Dong | G06F 9/45558 |
| 11,262,918 | B1 * | 3/2022 | Venugopal | G06F 3/0646 |
| 2004/0172579 | A1 * | 9/2004 | Fu | G06F 11/073 711/E12.006 |
| 2006/0112247 | A1 * | 5/2006 | Ramany | H04L 67/1008 711/170 |
| 2016/0147575 | A1 * | 5/2016 | Singh | G06F 9/5088 718/105 |
| 2017/0061566 | A1 * | 3/2017 | Min | H04L 67/1097 |
| 2019/0042138 | A1 * | 2/2019 | Guim Bernat | G06F 3/0647 |
| 2019/0095104 | A1 * | 3/2019 | Greenfield | G06F 3/0604 |

FOREIGN PATENT DOCUMENTS

WO     WO-2018225219 A1 * 12/2018 ............. H02J 13/00

\* cited by examiner

*Primary Examiner* — Charles Rones
*Assistant Examiner* — Alexander Vinnitsky
(74) *Attorney, Agent, or Firm* — Joseph Mencher (57) ABSTRACT

A storage usage management system includes a storage usage management subsystem coupled to first and second storage devices. The storage usage management subsystem collects first write usage data from use of the first storage device by a host mapped to the first storage device, determines that second write usage data from use of the first storage device by the host exceeds first metric(s) associated with the first write usage data by a first threshold, and collects the second write usage data and third write usage data from immediately subsequent use of the first storage device by the host. If the storage usage management subsystem determines that the second and third write usage data exceed second metric(s) associated with the first write usage data by a second threshold, it uses the second and third write usage data to determine whether to remap the host to the second storage device.

20 Claims, 6 Drawing Sheets

STORAGE-USAGE-BASED HOST/STORAGE MAPPING MANAGEMENT SYSTEM

BACKGROUND

The present disclosure relates generally to information handling systems, and more particularly to managing the use of storage resources by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, often utilize storage devices as part of their operation. For example, server devices may provide virtual machines or other hosts that utilize storage devices such as, for example, Solid State Drive (SSD) storage devices, for the storage and retrieval of data. As will be appreciated by one of skill in the art, SSD storage devices may be configured with different "endurances" in order to, for example, optimize those SSD storage devices for read-intensive operations, write-intensive operations, or mixed-use (e.g., read and write) operations, and any particular server device in a datacenter may include SSD storage device(s) configured with any of the endurances discussed above (e.g., with SSD storage devices having the same endurance configurations provided in "endurance groups" in the server device). In many situations, virtual machines provided by a server device may be mapped to SSD storage devices in that server device using, for example, Raw Device Mapping (RDM) techniques or "Passthru disk" techniques known in the art. However, virtual machines provided by a server device may service workloads (e.g., provided by host applications) that may have varying Input/Output (I/O) loads, which in some situations (incorrect initial mapping situations, changing I/O load situations, etc.) can result in a virtual machine being mapped to an SSD storage device that is configured with an endurance that is not appropriate for the I/O load provided by the workload being serviced by that virtual machine. As will be appreciated by one of skill in the art, the mismatching of particular I/O load workloads (e.g., write-intensive workloads) to SSD storage devices configured with a particular endurance (e.g., a read-intensive endurance) can lead to uneven usage and wear on SSD storage devices, I/O performance issues, Qualify of Service (QoS) issues (which can lead to cluster-level issues such as SSD storage device or server device failures), and/or other issues known in the art.

Accordingly, it would be desirable to provide a storage usage management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a storage usage management engine that is configured to: collect a plurality of first write usage data for a first storage device that is associated with first write operations performed by a host that is mapped to the first storage device; determine that second write usage data for the first storage device that is associated with second write operations performed by the host exceeds at least one first metric associated with the plurality of first write usage data by a first threshold; collect the second write usage data and a plurality of third write usage data that is associated with third write operations that are performed by the host immediately subsequent to the second write operations; determine whether the second write usage data and the plurality of third write usage data exceeds at least one second metric associated with the plurality of first write usage data by a second threshold; and use, in response to the second write usage data and the plurality of third write usage data not exceeding the at least one second metric associated with the plurality of first write usage data by the second threshold, the second write usage data and the plurality of third write usage data to determine whether to remap the host from the first storage device to a second storage device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
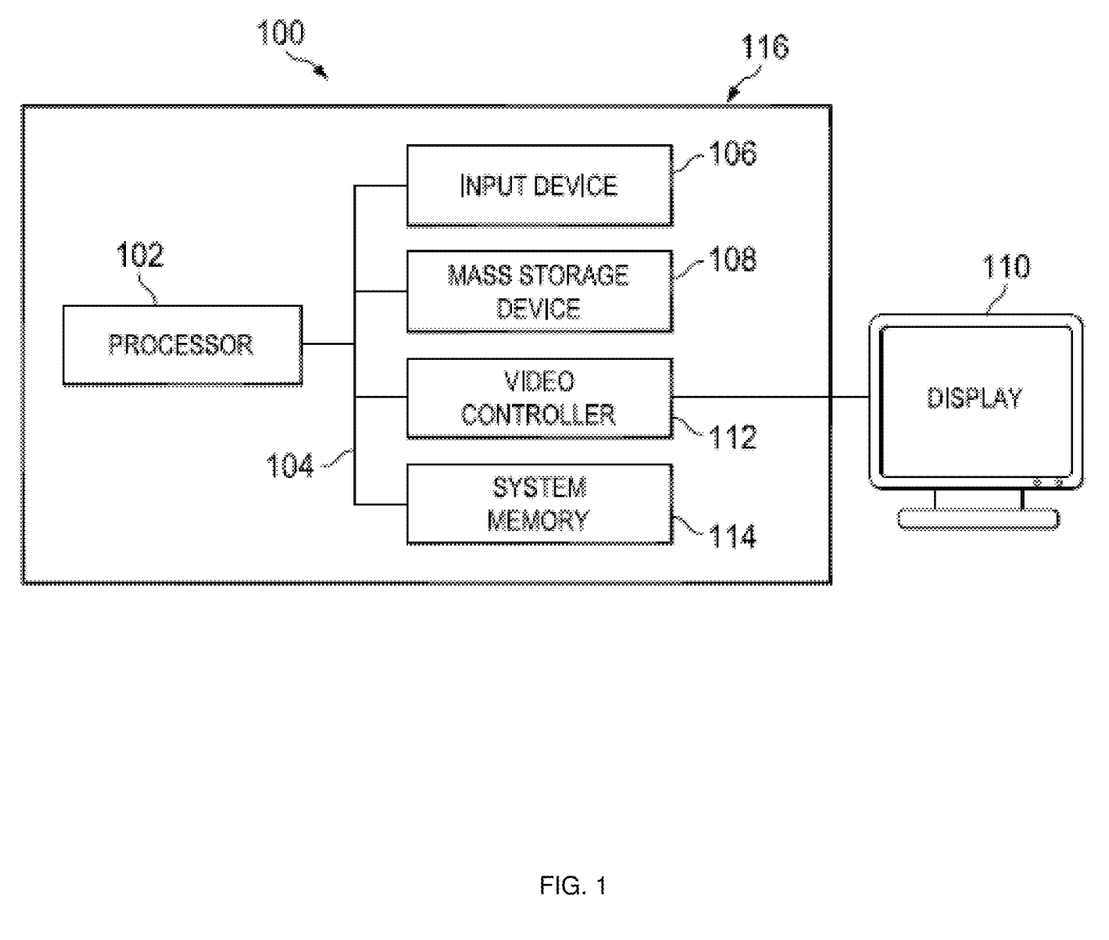
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
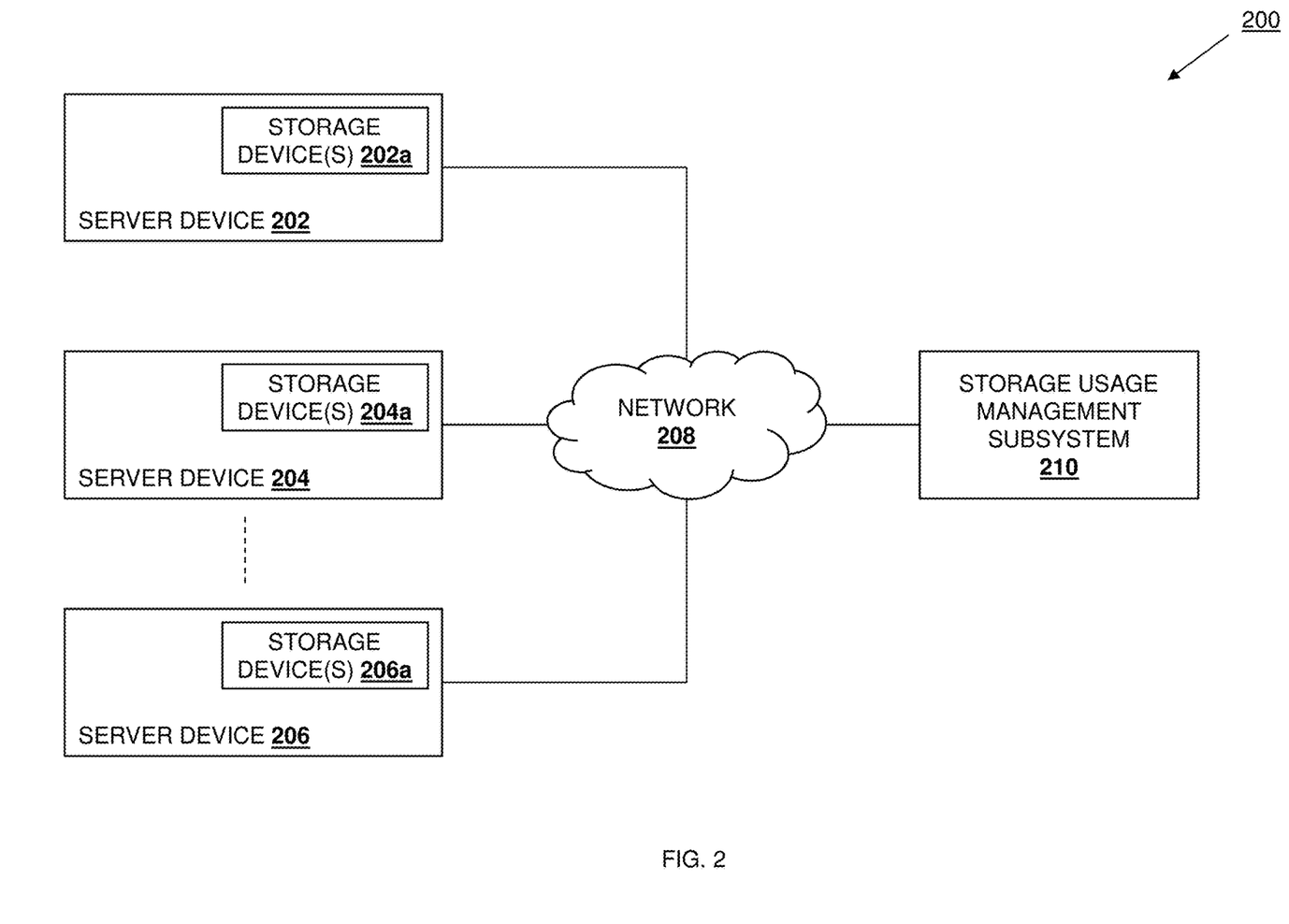
FIG. 2 is a schematic view illustrating an embodiment of a networked system that may include the storage usage management system of the present disclosure.

Referring now to FIG. 2, an embodiment of a networked system 200 is illustrated. In the illustrated embodiment, the networked system 200 includes a plurality of server devices 202, 204, and up to 206. In an embodiment, the server devices 202-206 may be provided by the IHS 100 discussed above with reference to FIG. 1, and/or may include some or all of the components of the IHS 100. However, while illustrated and discussed as being provided by server devices, one of skill in the art in possession of the present disclosure will recognize that the storage devices and hosts provided in the networked system 200 may be included in and/or provided by any devices that may be configured to operate similarly as the server devices 202-206 discussed below. In the illustrated embodiment, each of the server devices 202-206 may include one or more storage devices, with the illustrated example including one or more storage devices 202a in the server device 202, one or more storage devices 204a in the server device 204, and one or more storage devices 206a in the server device 206. In the examples below, the storage devices 202a, 204a, and up to 206a are discussed as being provided by Solid State Drive (SSD) storage devices, but one of skill in the art in possession of the present disclosure will recognize that other storage technologies may fall within the scope of the present disclosure as well.

In the illustrated embodiment, each of the server devices 202-206 may be coupled to a network 208 that may be provide by a Local Area Network (LAN), the Internet, combinations thereof, and/or any other networks that would be apparent to one of skill in the art in possession of the present disclosure. Furthermore, a storage usage management subsystem 210 is illustrated and discussed below as being coupled via the network 208 to the server devices 202-206. In an embodiment, the storage usage management subsystem 210 may be provided by the IHS 100 discussed above with reference to FIG. 1, and/or may include some or all of the components of the IHS 100, and in specific examples may be provided by a Software Defined Storage (SDS) subsystem (e.g., an SDS orchestration layer), a hypervisor subsystem, and/or in a variety of other manners that will fall within the scope of the present disclosure as well. As such, while illustrated and discussed as being provided by a particular dedicated subsystem, one of skill in the art in possession of the present disclosure will recognize that the storage usage management subsystem 210 in the networked system 200 may be included in and/or provided by any devices or systems (e.g., as part of one or more of the server devices 202-206 or storage devices 202a-206a) that may be configured to operate similarly as the storage usage management subsystem 210 discussed below. Furthermore, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
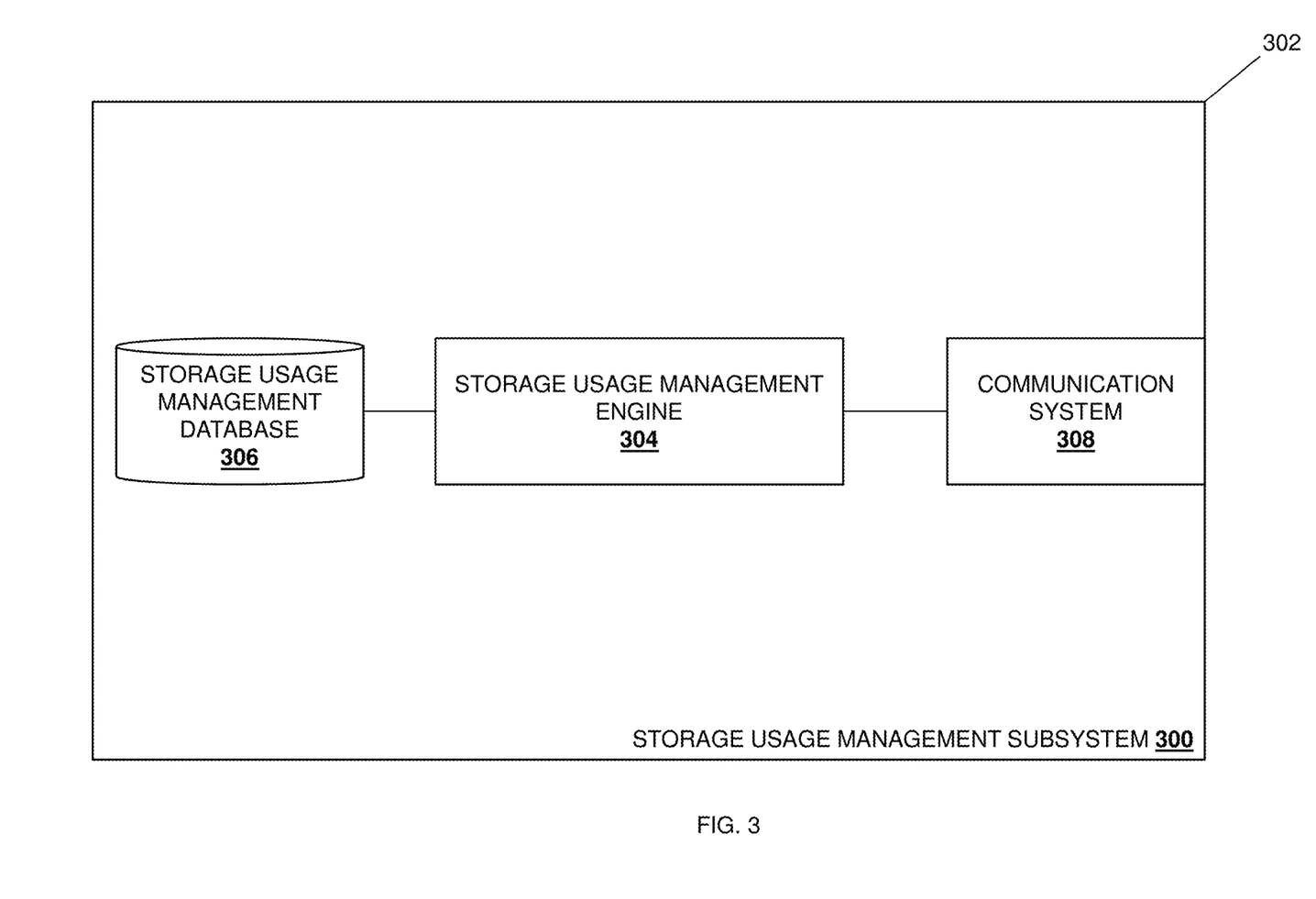
FIG. 3 is a schematic view illustrating an embodiment of a of a storage usage management subsystem that may be included in the networked system of FIG. 2.

Referring now to FIG. 3, an embodiment of a storage usage management subsystem 300 is illustrated that may provide the storage usage management subsystem 210 discussed above with reference to FIG. 2. As such, the storage usage management subsystem 300 may be provided by the IHS 100 discussed above with reference to FIG. 1 and/or may include some or all of the components of the IHS 100, and in specific examples may be provided by an SDS subsystem (e.g., an SDS orchestration layer), a hypervisor subsystem, and/or in a variety of other manners that will fall within the scope of the present disclosure as well. Furthermore, while illustrated and discussed as being provided by a particular dedicated subsystem, one of skill in the art in possession of the present disclosure will recognize that the storage usage management subsystem 300 may be included in and/or provided by any devices or systems (e.g., as part of one or more of the server devices 202-206 or storage devices 202a-206a) that may be configured to operate similarly as the storage usage management subsystem 300 discussed below. In the illustrated embodiment, the storage usage management subsystem 300 includes a chassis 302 that houses the components of the storage usage management subsystem 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a storage usage management engine 304 that is configured to perform the functionality of the storage usage management engines and/or storage usage management systems discussed below.

The chassis 302 may also house a storage system (not illustrated, but which may include the storage 108 discussed above with reference to FIG. 1) that is coupled to the storage usage management engine 304 (e.g., via a coupling between the storage system and the processing system) and that includes a storage usage management database 306 that is configured to store any of the information utilized by the storage usage management engine 304 discussed below. The chassis 302 may also house a communication system 308 that is coupled to the storage usage management engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific storage usage management subsystem 300 has been illustrated, one of skill in the art in possession of the present disclosure will recognize that storage usage management subsystem (or other devices operating according to the teachings of the present disclosure in a manner similar to that described below for the storage usage management subsystem 300) may include a variety of components and/or component configurations for providing conventional functionality, as well as the functionality discussed below, while remaining within the scope of the present disclosure as well.

Figure 4:
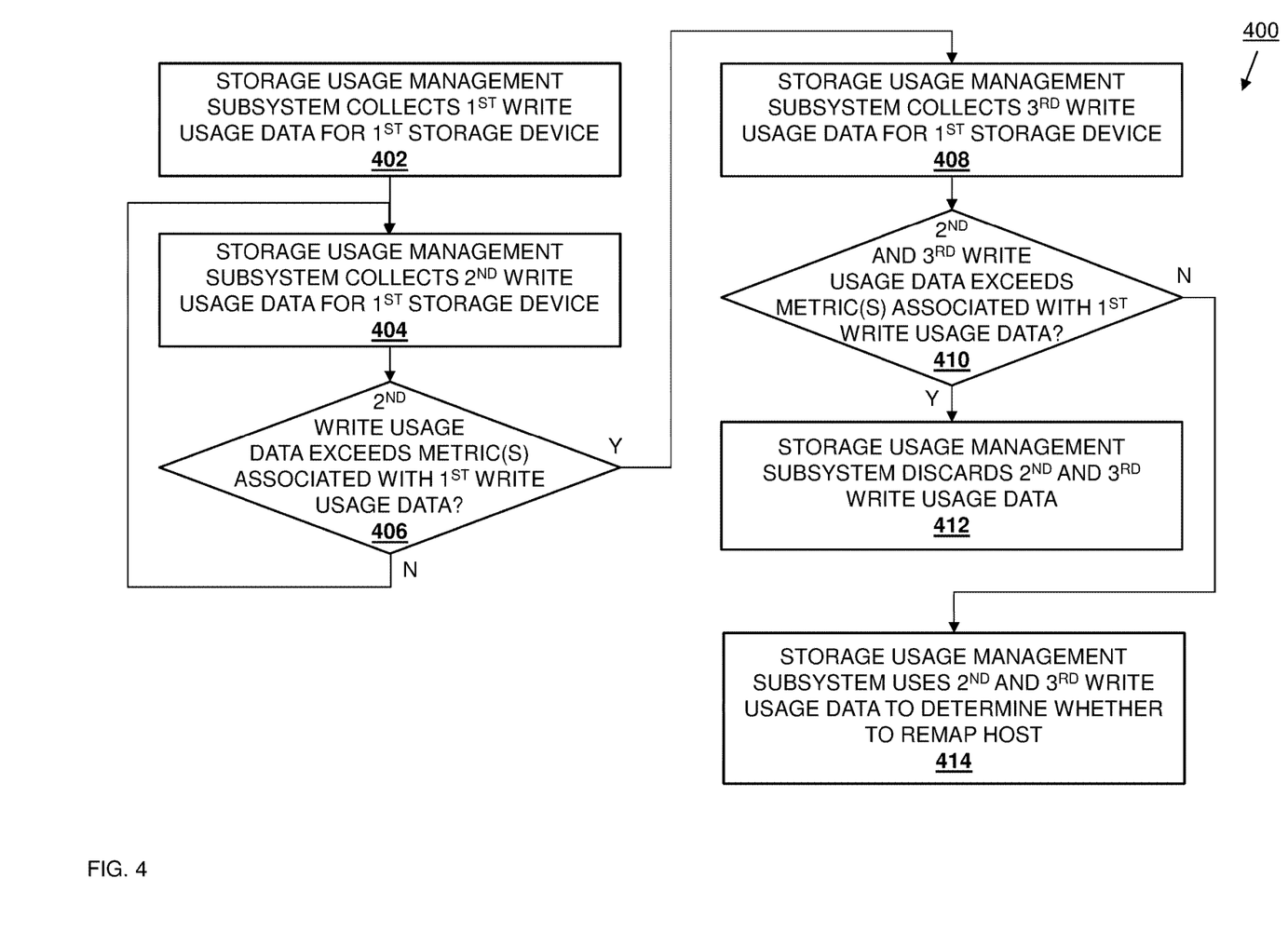
FIG. 4 is a flow chart illustrating an embodiment of a method for managing storage usage.

Referring now to FIG. 4, an embodiment of a method 400 for managing storage usage is illustrated. As discussed below, the systems and methods of the present disclosure provide for the management of storage usage based on the correlation of host I/O loads and storage device configurations to ensure I/O loads are provided on storage devices that are configured to handle them, while also ignoring "outlier" I/O loading so that only I/O load "trends" are considered in that management. For example, the storage usage management system of the present disclosure may include a storage usage management subsystem coupled to first and second storage devices. The storage usage management subsystem collects first write usage data from use of the first storage device by a host mapped to the first storage device, determines that second write usage data from use of the first storage device by the host exceeds first metric(s) associated with the first write usage data by a first threshold, and collects the second write usage data and third write usage data from immediately subsequent use of the first storage device by the host. If the storage usage management subsystem determines that the second and third write usage data exceed second metric(s) associated with the first write usage data by a second threshold, it uses the second and third write usage data to determine whether to remap the host to the second storage device. As such, I/O loads may be matched to storage devices configured with a particular endurance in order to prevent uneven usage and wear on storage devices, I/O performance issues, QoS issues that can lead to cluster-level issues such as storage device or server device failures, and/or other issues with conventional storage usage management systems.

In an embodiment, during or prior to the method 400, the storage usage management engine 304 in the storage usage management subsystem 210/300 may operate to communicate via its communication system 308 and through the network 208 with the storage devices 202a, 204a, and 206a in the server devices 202, 204, and 206, respectively, in order to retrieve information about those storage devices 202a, 204a, and 206a and maintain a registry (e.g., in the storage usage management database 306) of server devices including storage devices with different endurance configurations. For example, one or more of the storage devices 202a, 204a, and 206a may be identified in the registry discussed above as part of a read-intensive endurance group (e.g., including SSD storage devices configured with a read-intensive endurance), as part of a write-intensive endurance group (e.g., including SSD storage devices configured with a write-intensive endurance), and/or as part of a part of a mixed-use endurance group (e.g., including SSD storage devices configured with a mixed-use endurance). Furthermore, the information retrieved from the storage devices 202a, 204a, and 206a may include storage device identification information (e.g., a storage device model identification) for each storage device, a Drive Writes Per Day (DWPD) value for each storage device, Self-Monitoring, Analysis, and Reporting Technology (S.M.A.R.T.) attributes for each storage device (e.g., provided via storage device reliability reporting functionality that is used to anticipate hardware failures) that one of skill in the art in possession of the present disclosure will appreciate may identify the host write operations and the NAND write operations discussed in further detail below, as well as a variety of other information that would be apparent to one of skill in the art in possession of the present disclosure.

Figure 5A:
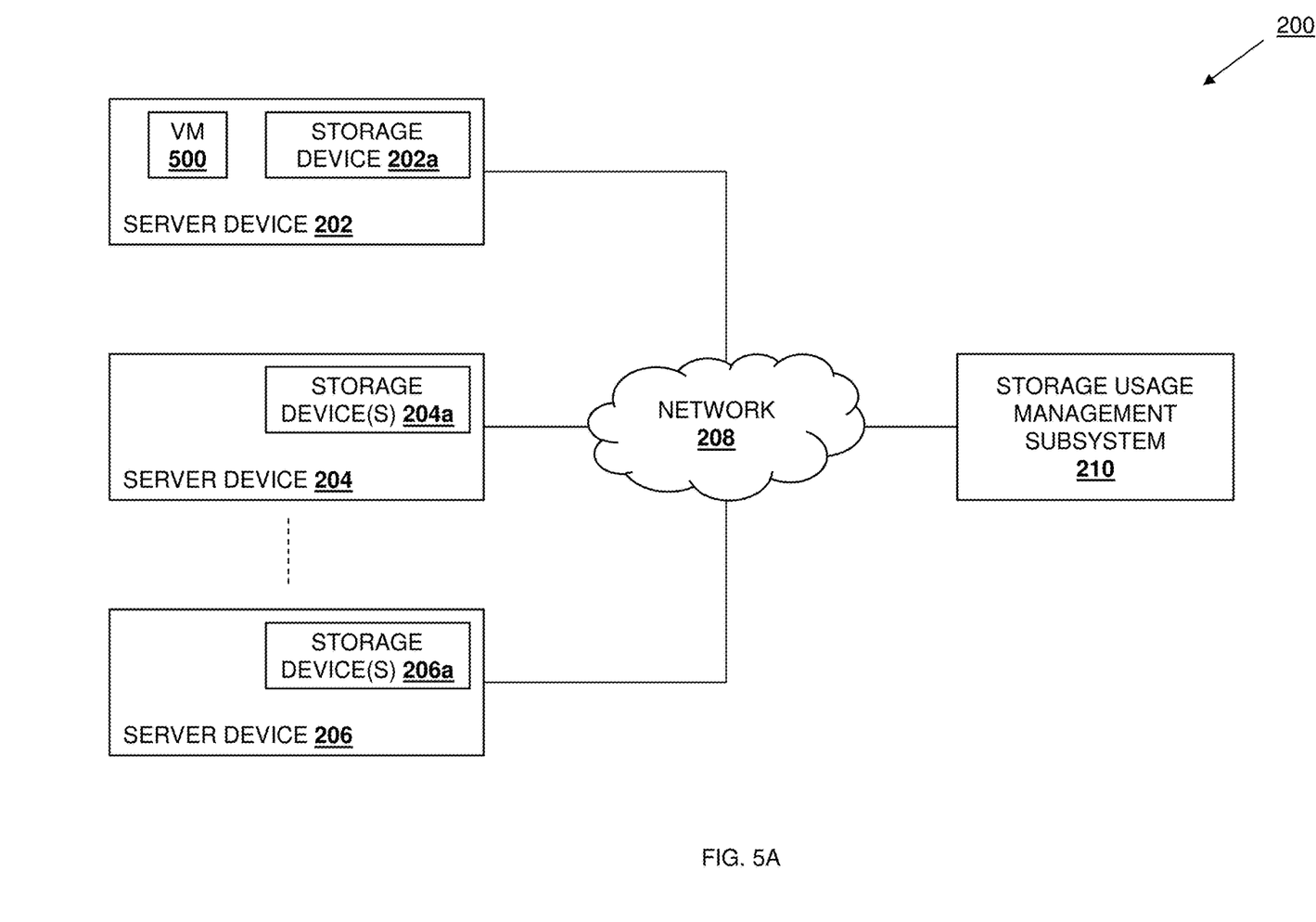
FIG. 5A is a schematic view illustrating an embodiment of the networked system of FIG. 2 operating during the method of FIG. 4.

Furthermore, during or prior to the method 400, any of the server devices 202, 204, and 206 may operate to provide a host that is configured to utilize as a storage device in that server device. For example, with reference to FIG. 5A, a processing system in the server device 202 may execute instructions that are stored on a memory system in that server device 202 in order to provide a host that is illustrated and described below as a Virtual Machine (VM) 500, but that one of skill in the art in possession of the present disclosure will appreciate may be provided by a variety of host applications while remaining within the scope of the present disclosure as well. Furthermore, as will be appreciated by one of skill in the art in possession of the present disclosure, one of the storage devices 202a (referred to below as "the storage device 202a") may provide a "pass-through" storage device that may be mapped to the virtual machine 500 using Raw Device Mapping (RDM) techniques, "Passthru disk" techniques, and/or other host/storage mapping techniques known in the art. However, while a particular host/storage device mapping has been described, one of skill in the art in possession of the present disclosure will appreciate that the host/VM 500 may be configured to utilize the storage device 202a as discussed below in a variety of manners that will fall within the scope of the present disclosure as well. Furthermore, while the server device 202 is illustrated and described in the examples below as providing the host that utilizes a storage device in that server device 202, one of skill in the art in possession of the present disclosure will appreciate that any of the server devices 202-206 may provide a host that utilizes a storage device in that server device (or in other server devices) while remaining within the scope of the present disclosure as well.

Figure 5B:
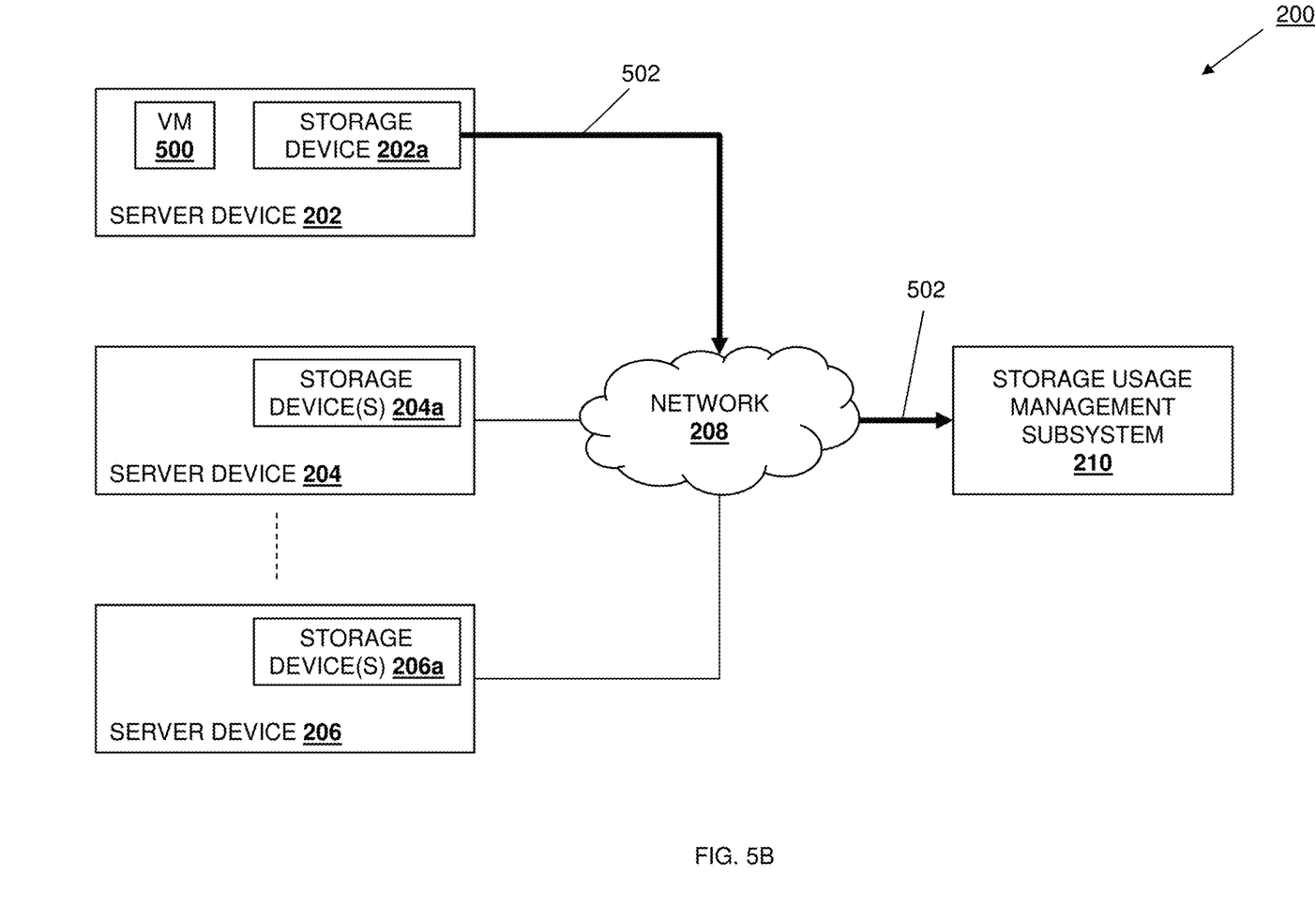
FIG. 5B is a schematic view illustrating an embodiment of the networked system of FIG. 2 operating during the method of FIG. 4.

The method 400 begins at block 402 where a storage usage management subsystem collects first write usage data for a first storage device. With reference to FIG. 5B, in an embodiment of block 402, the storage usage management engine 304 in the storage usage management subsystem 210/300 may perform write usage data collection operations 502 that include retrieving (via its communication system 308 and through the network 208) first write usage data from the storage devices 202a. As discussed above, the VM 500 provided by the server device 202 may have been configured to utilize the storage device 202a during its operation for the storage (e.g., write operations) and/or retrieval (e.g., read operations) of data, and the first write usage data collected by the storage usage management subsystem 210/300 at block 402 may include any information about that utilization that would be apparent to one of skill in the art in possession of the present disclosure.

In a specific example, the collection of the first write usage data by the storage usage management engine 304 in the storage usage management subsystem 210/300 at block 402 may be performed via the retrieval of the S.M.A.R.T. attributes for the storage device 202a discussed above that may identify host write operations (e.g., write operations originating from the VM 500 that instruct host write operations) and NAND write operations (e.g., write operations that are actually performed on the storage device 202a). As will be appreciated by one of skill in the art in possession of the present disclosure, storage devices may include "standard" sized storage elements (e.g., 4 KB storage elements) for any particular write operation, and while host write operations will often lead to NAND write operations that fill those storage elements (e.g., those host write operations instruct NAND write operations that write 4 KB or more of data in each storage element being utilized), in some situations host write operations may result in NAND write operations that do not fill those storage elements (e.g., those host write operations instruct NAND write operations that write less than 4 KB of data in at least one storage element). For example, when a host (e.g., a virtual machine) performs a write operation, the storage device receiving the write command will determine whether the data corresponding to the write command aligns on a 4 KB boundary and also is of 4 KB size (or a multiple of 4 KB, such as 16 KB, 64 KB, 128 KB, etc.) and, if so, the host write operation will result in a NAND write operation in a 1:1 fashion. However, if there is an alignment mismatch or a size mismatch between the data host write operation and the NAND cells in the storage device, the host write operation will result in a NAND write operation that is bigger than a host write operation (e.g., because the NAND page can only be written/programmed at 4 KB granularity).

Thus, in situations where host write operations do not result in NAND write operations that fill one or more storage elements in a storage device, the storage device may then perform additional NAND write operations (e.g., relative to the number of NAND write operations that are required as per the host write operations, e.g., if 512 bytes of data are required to be written as per the host write operations, 4 KB of NAND write operations may be performed) in order to "fill" the remaining portion of those storage elements (i.e., so that 4 KB of data is written to those storage elements) in order to, for example, provide for the defragmentation and/or wear leveling of the NAND cells in the storage device 202a.

Furthermore, the collection of first write usage data by the storage usage management engine 304 in the storage usage management subsystem 210/300 at block 402 may include the retrieval of "garbage collection" write usage information for the storage device 202a. As will be appreciated by one of skill in the art in possession of the present disclosure, storage devices may update first data stored in a first location in the storage device with second data by writing that second data to a second location in the storage device, which causes the first data to be marked for deletion at later time. Further still, the collection of first write usage data by the storage usage management engine 304 in the storage usage management subsystem 210/300 at block 402 may include the retrieval of "fragmentation" write usage information for the storage device 202a. As will be appreciated by one of skill in the art in possession of the present disclosure, storage devices may combine first data stored in a first location in the storage device with second data stored a second location in the storage device in order to provide for more efficient storage of that data. For example, each of the first data and the second data may be less than the "standard" sized storage elements (e.g., 5 KB in the example discussed above) for a storage device while being stored in separate first and second 5 KB storage elements on that storage device, and the storage device may determine that the first and second data are combinable in a single storage element (e.g., the first data is 3 KB and the second data is 2 KB, and thus may be combined in a 5 KB storage element) and, in response, write the first and second data to a third storage element, and then erase the first and second data from the first and second storage elements. However, while a few specific examples of write usage data are provided herein, one of skill in the art in possession of the present disclosure will appreciate that other write usage data will fall within the scope of the present disclosure as well.

In some embodiments, at block 402, the storage usage management engine 304 in the storage usage management subsystem 210/300 may periodically and/or regularly calculate a write amplification factor for the storage device 202a. For example, for any particular time interval between $t_n$ and $t_{n+1}$, the write amplification factor for a storage device may be calculated using the following equation:

$$WFt_{n+1}=(NWt_{n+1}-NWt_n)/(HWt_{n+1}-HWt_n)$$

As will be appreciated by one of skill in the art in possession of the present disclosure, $WFt_{n+1}$ provides the write amplification factor for the time interval between $t_n$ and $t_{n+1}$, $HWt_n$ provides the host write operations at $t_n$, $HWt_{n+1}$ provides the host write operations at $t_{n+1}$, $NWt_n$ provides the NAND write operations at $t_n$, and $NWt_{n+1}$ provides the NAND write operations at $t_{n+1}$. As such, the write amplification factor is a ratio of NAND write operations to host write operations in any particular time interval, and as discussed below may be utilized with host write operation information included in the write usage data for a storage device to identify the total number of write operations that are actually being performed on that storage device (i.e., total number of actual write operations=host write operations*$WFt_{n+1}$). Furthermore, while a specific equation is provided, one of skill in the art in possession of the present disclosure will appreciate how the random and sequential/spatial distribution of the host workload, the mix and/or size of host write operations, and/or other factors may contribute to the write amplification factor (particularly if the I/O write operation sizes are different than the program/erase block sizes for the storage device). However, while a particular technique for estimating write usage of a storage device is described, one of skill in the art in possession of the present disclosure will appreciate that write usage of a storage device may be identified in other manners while remaining within the scope of the present disclosure as well.

As will be appreciated by one of skill in the art in possession of the present disclosure, the collection of the first write usage data, calculation of the write amplification factor, and estimation of the write usage for a storage device may be a continuous process that, as described in further detail below, allows for an identification of the total number of actual write operations being performed on that storage device in any particular time interval, which in turn enables a determination of whether an I/O load being provided by a host on that storage device is suitable for the endurance configuration of that storage device. As will be appreciated by one of skill in the art from the discussion below, if a relatively average I/O load from a host results in a relatively high write amplification factor relative to the endurance configuration of its mapped storage device, a determination may be made to remap that host to a different storage device with a different endurance configuration.

However, the method 400 may also operate to identify relatively high/low I/O loads from the host and then make a determination of whether those I/O loads are "outlier" I/O loads that should be ignored for the purposes of write usage determinations for the storage device 202a, or whether those I/O loads are indicative of a new I/O load "trend" that should be considered for the purposes of write usage determinations for the storage device 202a. As such, in some embodiments, the storage usage management engine 304 in the storage usage management subsystem 210/300 may calculate a "running" average of the total number of actual write operations being performed on the storage device 202a, a standard deviation of the total number of actual write operations being performed on the storage device 202a, and/or any other metrics for the first write usage data collected at block 402.

The method 400 then proceeds to block 404 where the storage usage management subsystem collects second write usage data for the first storage device. With reference back to FIG. 5B, in an embodiment of block 402, the storage usage management engine 304 in the storage usage management subsystem 210/300 may perform the write usage data collection operations 502 that include retrieving (via its communication system 308 and through the network 208) second write usage data from the storage devices 202a. As discussed above, the VM 500 provided by the server device 202 may have been configured to utilize the storage device 202a during its operation for the storage (e.g., write operations) and/or retrieval (e.g., read operations) of data, and the second write usage data collected by the storage usage management subsystem 210/300 at block 402 may include any information about that utilization that would be apparent to one of skill in the art in possession of the present disclosure. In a specific example, at block 404, the storage usage management engine 304 in the storage usage management subsystem 210/300 may utilize the write amplification factor calculated for the time interval in which the second write usage data is collected in order to determine the total number of actual write operations being performed on the storage device 202a for that time interval in substantially the same manner as described above with the first write usage data.

The method 400 then proceeds to decision block 406 where it is determined whether the second write usage data exceeds metric(s) associated with the first write usage data. In an embodiment, at decision block 406, the storage usage management engine 304 in the storage usage management subsystem 210/300 may compare the total number of actual write operations being performed on the storage device 202a according to the second write usage data collected at block 404 with the "running" average that was calculated for the total number of actual write operations being performed on the storage device 202a using the first write usage data, and determine whether a difference between the two is greater than a threshold multiple of the standard deviation that was calculated for the total number of actual write operations being performed on the storage device 202a using the first write usage data. In a specific example, the determination at block 406 may be performed in accordance with Chebyshev's Inequality that provides, for a wide class of probability distributions, that no more than certain fraction of values can be more than a certain distance from the mean, and which is described by the equation:

$$Pr[|X-\mu| \geq k\sigma] \leq 1/k^2$$

As will be appreciated by one of skill in the art in possession of the present disclosure, X is a random variable with a finite expected value μ and a finite non-zero variance $\sigma^2$, and k is a real number that is greater than 0. In a specific example of the use of Chebyshev's Inequality in the method 400, k will typically be selected to be less than or equal to 5. One of skill in the art in possession of the present disclosure will recognize that Chebyshev's Inequality may be applied to completely arbitrary distributions provided they have a known mean/average and variance/standard deviation (such as the write usage data for the storage device 202a provided herein). As such, using the "running" average that was calculated for the total number of actual write operations being performed on the storage device 202a using the first write usage data as μ, the standard deviation that was calculated for the total number of actual write operations being performed on the storage device 202a using the first write usage data as a, the total number of actual write operations being performed on the storage device 202a according to the second write usage data as X, and an empirically selected value of k between 0 and 5, one of skill in the art in possession of the present disclosure will recognize how Chebyshev's Inequality may be utilized to determine when the total number of actual write operations being performed on the storage device 202a according to the second write usage data differs more than a threshold amount from the "running" average that was calculated for the total number of actual write operations being performed on the storage device 202a using the first write usage data.

If, at decision block 406, it is determined that the second write usage data does not exceed metric(s) associated with the first write usage data, the method 400 returns to block 404. In an embodiment, if the second write usage data does not exceed metric(s) associated with the first write usage data, that second write usage data collected at block 404 in a first iteration of the method 400 may become part of the first write usage data in a second iteration of the method 400, and "new" second write usage data may be collected at block 404 in the second iteration of the method 400. As such, the method 400 may loop such that the storage usage management engine 304 in the storage usage management subsystem 210/300 continues to collect second write usage data for the storage device 202a that then becomes part of the first write usage data as along as that second write usage data does not exceed metric(s) associated with the first write usage data (as defined according to that current iteration of the method).

If at decision block 406, it is determined that the second write usage data exceeds metric(s) associated with the first write usage data, the method 400 proceeds to block 408 where the storage usage management subsystem collects third write usage data for the first storage device. In an embodiment, at block 408 and in response to determining that the second write usage data exceeds metric(s) associated with the first write usage data at decision block 406, the storage usage management engine 304 in the storage usage management subsystem 210/300 may collect third write usage data for the storage device 202a and associate that third write usage data with the second write usage data. For example, in response to determining that the second write usage data exceeds metric(s) associated with the first write usage data at decision block 406 (e.g., based on Chebyshev's Inequality as discussed above), the storage usage management engine 304 in the storage usage management subsystem 210/300 may generate an "auxiliary array", store the second write usage data in that auxiliary array, and then collect third write usage data that is generated for the storage device 202a immediately subsequent to the second write usage data and store that third write usage data in the auxiliary array along with the second write usage data. As will be appreciated by one of skill in the art in possession of the present disclosure, while the third write usage data may exceed the metric(s) associated with the first write usage data (i.e., the metric(s) that were exceeded by the second write usage data), it will be stored in the auxiliary array with the second write usage data regardless of whether it exceed the metric(s) associated with the first write usage data.

The method 400 then proceeds to decision block 410 where it is determined whether the second and third write usage data exceeds metric(s) associated with the first write usage data. In an embodiment, at decision block 410, the storage usage management engine 304 in the storage usage management subsystem 210/300 may determine whether the second write usage data and the third write usage data exceed metrics associated with the first write usage data. Continuing with the specific embodiment provided above, the auxiliary array in which the second write usage data and the third write usage data is stored may include a maximum size. For example, the auxiliary array may provide for between 100 and 500 entries (e.g., a first entry for the second write usage data, a second entry for third write usage data collected immediately subsequent to that, a third entry for third write usage data collected immediately subsequent to that, and so on . . . ), and the number of entries in the auxiliary array may depend on the time interval within which write usage data is collected by the storage usage management engine 304 in the storage usage management subsystem 210/300.

In some embodiments, the storage usage management engine 304 in the storage usage management subsystem 210/300 may calculate a "running" average of the total number of actual write operations being performed on the storage device 202a according to the second and third write usage data, a standard deviation of the total number of actual write operations being performed on the storage device 202a according to the second and third write usage data, and/or any other metrics for the second and third write usage data collected at blocks 404 and 408. In a specific example, the "running" average and standard deviation of the total number of actual write operations being performed on the storage device 202a according to the second and third write usage data may be calculated/recalculated for each entry of third write usage data in the auxiliary array for at least the first half of the available entries in the auxiliary array, which as discussed below allows a preliminary determination to be made of whether the second and third write usage data is "outlier" data that should be discarded, or is part of a new "trend" that should be considered when determining the write usage of the storage device 202a.

In an embodiment, when third write usage data is added to the auxiliary array such that half of the auxiliary array includes entries (e.g., the entry with the second write usage data and the entries with third write usage data), the storage usage management engine 304 in the storage usage management subsystem 210/300 may make a preliminary determination of whether the second and third write usage data is "outlier" data that should be discarded, or is part of a new "trend" that should be considered when determining the write usage of the storage device 202a. For example, presuming the first write usage data includes a threshold number of data points that allow for the comparison, the preliminary determination may include the storage usage management engine 304 in the storage usage management subsystem 210/300 determining whether an absolute difference of the average of the total number of actual write operations being performed on the storage device 202a according to the first write usage data and the average of the total number of actual write operations being performed on the storage device 202a according to the second and third write usage data is greater than three standard deviations of the total number of actual write operations being performed on the storage device 202a according to the first write usage data, or:

$$|Mean(1^{st} \text{ write usage data}) - Mean(2^{nd} \& 3^{rd} \text{ write usage data})| > 3\sigma(1^{st} \text{ write usage data})$$

However, assuming that the first write usage data does not include a threshold number of data points that allow for the comparison, the preliminary determination may include the storage usage management engine 304 in the storage usage management subsystem 210/300 determining whether an absolute difference of the average of the total number of actual write operations being performed on the storage device 202a according to the first write usage data and the average of the total number of actual write operations being performed on the storage device 202a according to the second and third write usage data is greater than one standard deviation of the total number of actual write operations being performed on the storage device 202a according to the second and third write usage data, or:

$$|Mean(1^{st} \text{ write usage data}) - Mean(2^{nd} \& 3^{rd} \text{ write usage data})| > \sigma(2^{nd} \& 3^{rd} \text{ write usage data})$$

As discussed below, if the preliminary determination performed by the storage usage management engine 304 in the storage usage management subsystem 210/300 discussed above determines that the second and third write usage data is "outlier" data that exceeds metrics associated with the first write usage data, then the method 400 proceeds to block 412. However, if the preliminary determination performed by the storage usage management engine 304 in the storage usage management subsystem 210/300 discussed above determines that the second and third write usage data is part of a new "trend" that does not exceed metrics associated with the first write usage data, then the storage usage management engine 304 in the storage usage management subsystem 210/300 may operate to perform a final determination of whether the second and third write usage data is "outlier" data that should be discarded, or is part of a new "trend" that should be considered when determining the write usage of the storage device 202a.

For example, if the preliminary determination performed by the storage usage management engine 304 in the storage usage management subsystem 210/300 discussed above determines that the second and third write usage data is part of a new "trend" that does not exceed metrics associated with the first write usage data, additional third write usage data may be collected from the storage device 202a and stored in the auxiliary array until the auxiliary array is full. The "running" average and the standard deviation for the total number of actual write operations being performed on the storage device 202a according to the second and third write usage data may then be calculated using all the entries in the auxiliary array.

Chebyshev's Inequality may then be utilized with the "running" average that was calculated for the total number of actual write operations being performed on the storage device 202a using the second and third write usage data in the auxiliary array as μ, the standard deviation that was calculated for the total number of actual write operations being performed on the storage device 202a using the second and third write usage data in the auxiliary array as a, the total number of actual write operations being performed on the storage device 202a according to the second write usage data as X, and an empirically selected value of k between 0 and 5, which one of skill in the art in possession of the present disclosure will recognize provides for a determination of when the total number of actual write operations being performed on the storage device 202a according to the second write usage data differs more than a threshold amount from the "running" average that was calculated for the total number of actual write operations being performed on the storage device 202a using the second and third write usage data.

If, at decision block 410, it is determined that the second and third write usage data exceeds metric(s) associated with the first write usage data, the method 400 proceeds to block 412 where the storage usage management subsystem discards the second and third write usage data. With reference to an embodiment in which the preliminary determination discussed above at decision block 410 is performed when the first write usage data includes a threshold number of data points that allow for the comparison, at decision block 410 the storage usage management engine 304 in the storage usage management subsystem 210/300 may determine that an absolute difference of the average of the total number of actual write operations being performed on the storage device 202a according to the first write usage data and the average of the total number of actual write operations being performed on the storage device 202a according to the second and third write usage data is greater than three standard deviations of the total number of actual write operations being performed on the storage device 202a according to the first write usage data and, in response, determine that the second and third write usage data is "outlier" data, discard that second and third write usage data at block 412, and clear the auxiliary array.

In another embodiment and with continued reference to the preliminary determination discussed above at decision block 410 when the first write usage data includes a threshold number of data points that allow for the comparison, at decision block 410 the storage usage management engine 304 in the storage usage management subsystem 210/300 may determine that an absolute difference of the average of the total number of actual write operations being performed on the storage device 202a according to the first write usage data and the average of the total number of actual write operations being performed on the storage device 202a according to the second and third write usage data is less than three standard deviations of the total number of actual write operations being performed on the storage device 202a according to the first write usage data and, in response, determine that the second and third write usage data is "trend" data. However, the storage usage management engine 304 in the storage usage management subsystem 210/300 may then perform the final determination discussed above at block 410 using Chebyshev's Inequality and determine that the total number of actual write operations being performed on the storage device 202a according to the second write usage data differs more than a threshold amount from the "running" average that was calculated for the total number of actual write operations being performed on the storage device 202a using the second and third write usage data and, in response, determine that the second and third write usage data is "outlier" data, discard that second and third write usage data at block 412, and clear the auxiliary array.

With reference to an embodiment in which the preliminary determination discussed above at decision block 410 is performed when the first write usage data does not include a threshold number of data points that allow for the comparison, at decision block 410 the storage usage management engine 304 in the storage usage management subsystem 210/300 may determine that an absolute difference of the average of the total number of actual write operations being performed on the storage device 202a according to the first write usage data and the average of the total number of actual write operations being performed on the storage device 202a according to the second and third write usage data is greater than one standard deviation of the total number of actual write operations being performed on the storage device 202a according to the second and third write usage data and, in response, determine that the second and third write usage data is "outlier" data, discard that second and third write usage data at block 412, and clear the auxiliary array.

In another embodiment and with continued reference to the preliminary determination discussed above at decision block 410 when the first write usage data does not includes a threshold number of data points that allow for the comparison, at decision block 410 the storage usage management engine 304 in the storage usage management subsystem 210/300 may determine that an absolute difference of the average of the total number of actual write operations being performed on the storage device 202a according to the first write usage data and the average of the total number of actual write operations being performed on the storage device 202a according to the second and third write usage data is less than one standard deviation of the total number of actual write operations being performed on the storage device 202a according to the second and third write usage data and, in response, determine that the second and third write usage data is "trend" data. However, the storage usage management engine 304 in the storage usage management subsystem 210/300 may then perform the final determination discussed above at block 410 using Chebyshev's Inequality and determine that the total number of actual write operations being performed on the storage device 202a according to the second write usage data differs more than a threshold amount from the "running" average that was calculated for the total number of actual write operations being performed on the storage device 202a using the second and third write usage data and, in response, determine that the second and third write usage data is "outlier" data, discard that second and third write usage data at block 412, and clear the auxiliary array.

If at decision block 410, it is determined that the second and third write usage data does not exceed metric(s) associated with the first write usage data, the method 400 proceeds to block 414 where the storage usage management subsystem uses the second and third write usage data to remap a host. In an embodiment and with reference to the preliminary determination discussed above at decision block 410 when the first write usage data includes a threshold number of data points that allow for the comparison, at decision block 410 the storage usage management engine 304 in the storage usage management subsystem 210/300 may determine that an absolute difference of the average of the total number of actual write operations being performed on the storage device 202a according to the first write usage data and the average of the total number of actual write operations being performed on the storage device 202a according to the second and third write usage data is less than three standard deviations of the total number of actual write operations being performed on the storage device 202a according to the first write usage data and, in response, determine that the second and third write usage data is "trend" data. The storage usage management engine 304 in the storage usage management subsystem 210/300 may then perform the final determination discussed above at block 410 using Chebyshev's Inequality and determine that the total number of actual write operations being performed on the storage device 202a according to the second write usage data does not differ more than a threshold amount from the "running" average that was calculated for the total number of actual write operations being performed on the storage device 202a using the second and third write usage data and, in response, determine that the second and third write usage data is "trend" data and use the second and third write usage data to remap the virtual machine 400 at block 414, discussed in further detail below.

In another embodiment and with reference to the preliminary determination discussed above at decision block 410 when the first write usage data does not include a threshold number of data points that allow for the comparison, at decision block 410 the storage usage management engine 304 in the storage usage management subsystem 210/300 may determine that an absolute difference of the average of the total number of actual write operations being performed on the storage device 202a according to the first write usage data and the average of the total number of actual write operations being performed on the storage device 202a according to the second and third write usage data is less than one standard deviation of the total number of actual write operations being performed on the storage device 202a according to the second and third write usage data and, in response, determine that the second and third write usage data is "trend" data. The storage usage management engine 304 in the storage usage management subsystem 210/300 may then perform the final determination discussed above at block 410 using Chebyshev's Inequality and determine that the total number of actual write operations being performed on the storage device 202a according to the second write usage data does not differ more than a threshold amount from the "running" average that was calculated for the total number of actual write operations being performed on the storage device 202a using the second and third write usage data and, in response, determine that the second and third write usage data is "trend" data and use the second and third write usage data to remap the virtual machine 400 at block 414, discussed in further detail below.

In an embodiment, in response to determining that the second and third write usage data is "trend" data during the final determination at block 410, the storage usage management engine 304 in the storage usage management subsystem 210/300 may then combine the second and third write usage data with the first write usage data in the storage usage management database 306, and then calculate an average and standard deviation of the total number of actual write operations being performed on the storage device 202a according to the first, second, and third write usage data. Subsequent to combining the second and third write usage data with the first write usage data in the storage usage management database 306, the auxiliary array may be cleared.

In an embodiment, at block 414, the storage usage management engine 304 in the storage usage management subsystem 210/300 may use the second and third write usage data (along with the first write usage data) to determine whether to remap the virtual machine 500 by determining whether the average of the total number of actual write operations being performed on the storage device 202a according to the first, second, and third write usage data exceeds a threshold associated with the endurance configuration of the storage device 202a. For example, the average of the total number of actual write operations being performed on the storage device 202a according to the first, second, and third write usage data may be compared to the DWPD for the storage device 202a to determine whether the I/O load being provided by the virtual machine 500 will shorten the expected life of the storage device 202a by more than a threshold amount. However, while a particular I/O load/storage device threshold has been described, one of skill in the art in possession of the present disclosure will appreciate how a variety of comparisons may be made between the I/O load provided by the virtual machine and the endurance configuration of the storage device 202a in order to determine whether remapping should occur.

As such, the I/O load/storage device remapping determination may consider a large amount of sample data in order to determine if an I/O load is suitable for the underlying passthrough storage device and, if it is not, I/O load/storage device remapping operations may be initialized. Furthermore, if the I/O load from the host on a storage device changes, the I/O load/storage device remapping determination may consider a large amount of sample data to rule out sporadic changes in I/O load and determine if a new I/O trend exists and justifies remapping operations. Thus, a relatively high number of data sample may be considered before remapping an I/O load to a storage device in order to avoid repeated remapping of any particular I/O load between two or more storage devices.

In response to determining that the average of the total number of actual write operations being performed on the storage device 202a according to the first, second, and third write usage data exceeds a threshold associated with the endurance configuration of the storage device 202a, the storage usage management engine 304 in the storage usage management subsystem 210/300 may instruct the server device 202 (e.g., a hypervisor in the server device 202) to remap the virtual machine 500 to a different storage device in the server device 202 with an endurance configuration that is appropriate for the I/O load being provided by the virtual machine 500, or may instruct the server device 202 (e.g., a hypervisor in the server device 202) to move the virtual machine 500 to another server device (e.g., the server device 204 or 206) that is known to have a storage device with an endurance configuration that is appropriate for the I/O load being provided by the virtual machine 500 so that the virtual machine 500 may be mapped to that storage device. As such, in some examples, the storage usage management engine 304 in the storage usage management subsystem 210/300 may advise the server device 202 (e.g., a hypervisor in the server device 202) with details of the server device(s) in its server group that have a suitable storage device for the I/O load of the virtual machine 500.

Furthermore, in some examples, the storage usage management engine 304 in the storage usage management subsystem 210/300 may advise the server device 202 (e.g., a hypervisor in the server device 202) to increase or decrease cache usage depending on the write amplification factor for a storage device, and one of skill in the art in possession of the present disclosure will appreciate how increase cache usage in this manner may contribute to a lower write amplification factor, thus allowing for the delaying of host/storage device remapping at block 414 if necessary.

Further still, in some examples the monitoring/write usage data collection time intervals discussed above may be adjusted to reduce randomness of the collected write usage data in order to optimize the removal of outlier data. For example, if the standard deviation of the total number of actual write operations being performed on the storage device 202*a* according to second and third write usage data is relatively much greater than the standard deviation of the total number of actual write operations being performed on the storage device 202*a* according to first write usage data, then the monitoring/write usage data collection time interval may be increased (e.g., because the second and third write usage data is relatively more random than the first write usage data, and increasing the monitoring/write usage data collection time interval will operate to average out the write usage data in per-unit-time for each monitoring/write usage data collection time interval, thus reducing the outlier data points). In another example, if the standard deviation of the total number of actual write operations being performed on the storage device 202*a* according to second and third write usage data is relatively much less than the standard deviation of the total number of actual write operations being performed on the storage device 202*a* according to first write usage data, then the monitoring/write usage data collection time interval may be decreased (e.g., because the second and third write usage data is relatively more homogenous than the first write usage data, and reducing the monitoring/write usage data collection time interval will allow write usage data to be monitored in a smaller, more granular manner).

Thus, systems and methods have been described that provide for the management of SSD usage based on the correlation of I/O loads and SSD configurations to ensure I/O loads are provided on SSDs that are configured to handle them, while also ignoring "outlier" I/O loading so that only I/O load "trends" are considered in that management. For example, the SSD usage management system of the present disclosure may include an SSD usage management subsystem coupled to first and second SSDs. The SSD usage management subsystem collects first write usage data from use of the first SSD by a VM mapped to the first SSD, determines that second write usage data from use of the first SSD by the VM exceeds first metric(s) associated with the first write usage data by a first threshold, and collects the second write usage data and third write usage data from immediately subsequent use of the first SSD by the VM. If the storage usage management subsystem determines that the second and third write usage data exceed second metric(s) associated with the first write usage data by a second threshold, it uses the second and third write usage data to determine whether to remap the host to the second SSD. As such, I/O loads may be matched to SSD configured with a particular endurance in order to prevent uneven usage and wear on SSDs, I/O performance issues, QoS issues that can lead to cluster-level issues such as SSD or server device failures, and/or other issues with conventional SSD usage management systems Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for managing storage usage, comprising:
collecting, by a storage usage management subsystem, a first write usage data for a first storage device having a first write usage configuration, wherein the first write usage data was generated in response to first write operations performed by a host that is mapped to the first storage device;
collecting, by the storage usage management subsystem, second write usage data for the first storage device that was generated in response to second write operations performed by the host;
determining, by the storage usage management subsystem, that the second write usage data exceeds at least one first metric associated with the first write usage data by a first threshold;
collecting, by the storage usage management subsystem in response to determining that the second write usage data exceeds the at least one first metric associated with the first write usage data by the first threshold, third write usage data for the first storage device that was generated in response to third write operations performed by the host immediately subsequent to the second write operations;
determining, by the storage usage management subsystem, whether the second write usage data and the third write usage data exceeds at least one second metric associated with the first write usage data by a second threshold; and
determining, by the storage usage management subsystem in response to determining that the second write usage data and the third write usage data do not exceed the at least one second metric associated with the first write usage data by the second threshold, whether the first write usage data, the second write usage data, and the third write usage data indicate that a first write usage threshold for the first write usage configuration has been exceeded; and
remapping, by the storage usage management subsystem in response to determining that the first write usage data, the second write usage data, and the third write usage data indicate that the first write usage threshold for the first write usage configuration has been exceeded, the host from the first storage device to a second storage device.

2. The method of claim 1, further comprising:
discarding, by the storage usage management subsystem in response to determining that the second write usage data and the third write usage data exceeds the at least one second metric associated with the first write usage data by the second threshold, the second write usage data and the third write usage data.

3. The method of claim 1, further comprising:
calculating, by the storage usage management subsystem, a write amplification factor for the first storage device; and
generating, by the storage usage management subsystem, the first write usage data, the second write usage data, and the third write usage data for the first storage device using the write amplification factor.

4. The method of claim 3, wherein the write amplification factor for the first storage device includes a ratio of host initiated write operations and storage device initiated write operations.

5. The method of claim 1, wherein the determining that second write usage data exceeds the at least one first metric associated with the first write usage data by the first threshold includes:

determining, by the storage usage management subsystem, that the second write usage data exceeds an average of the first write usage data by a threshold multiple of standard deviations of the first write usage data.

6. The method of claim 1, wherein the determining whether the second write usage data and the third write usage data exceeds the at least one second metric associated with the first write usage data by the second threshold includes:
determining, by the storage usage management subsystem, whether a difference between a first average of the first write usage data and a second average of a combination of the second write usage data and the third write usage data exceeds a threshold multiple of standard deviations of the first write usage data.

7. The method of claim 1, wherein the determining whether the second write usage data and the third write usage data exceeds the at least one second metric associated with the first write usage data by the second threshold includes:
determining, by the storage usage management subsystem, whether a difference between a first average of the first write usage data and a second average of a combination of the second write usage data and the third write usage data exceeds a threshold multiple of standard deviations of a combination of the second write usage data and the third write usage data.

8. An Information Handling System (IHS), comprising:
a processing system; and
a memory system that is coupled to the processing system and that includes instructions that, when executed by the processing system, cause the processing system to provide a storage usage management engine that is configured to:
collect first write usage data for a first storage device having a first write usage configuration, wherein the first write usage data was generated in response to first write operations performed by a host that is mapped to the first storage device;
collect second write usage data for the first storage device that was generated in response to second write operations performed by the host;
determine that the second write usage data exceeds at least one first metric associated with the first write usage data by a first threshold;
collect, in response to determining that the second write usage data exceeds the at least one first metric associated with the first write usage data by the first threshold, third write usage data for the first storage device that was generated in response to third write operations performed by the host immediately subsequent to the second write operations;
determine whether the second write usage data and the third write usage data exceeds at least one second metric associated with the first write usage data by a second threshold;
determine, in response to determining that the second write usage data and the third write usage data do not exceed the at least one second metric associated with the first write usage data by the second threshold, whether the first write usage data, the second write usage data, and the third write usage data indicate that a first write usage threshold for the first write usage configuration has been exceeded;
remap, in response to determining that the first write usage data, the second write usage data, and the third write usage data indicate that the first write usage threshold for the first write usage configuration has been exceeded, the host from the first storage device to a second storage device.

9. The IHS of claim 8, wherein the storage usage management engine is configured to:
discard, in response to determining that the second write usage data and the third write usage data exceed the at least one second metric associated with the first write usage data by the second threshold, the second write usage data and the third write usage data.

10. The IHS of claim 8, wherein the storage usage management engine is configured to:
calculate a write amplification factor for the first storage device; and
generate the first write usage data, the second write usage data, and the third write usage data for the first storage device using the write amplification factor.

11. The IHS of claim 10, wherein the write amplification factor for the first storage device includes a ratio of host initiated write operations and storage device initiated write operations.

12. The IHS of claim 8, wherein the determining that second write usage data exceeds the at least one first metric associated with the first write usage data by the first threshold includes:
determining that the second write usage data exceeds an average of the first write usage data by a threshold multiple of standard deviations of the first write usage data.

13. The IHS of claim 8, wherein the determining whether the second write usage data and the third write usage data exceeds the at least one second metric associated with the first write usage data by the second threshold includes:
determining whether a difference between a first average of the first write usage data and a second average of a combination of the second write usage data and the third write usage data exceeds a threshold multiple of standard deviations of the first write usage data.

14. The IHS of claim 8, wherein the determining whether the second write usage data and the third write usage data exceeds the at least one second metric associated with the first write usage data by the second threshold includes:
determining whether a difference between a first average of the first write usage data and a second average of a combination of the second write usage data and the third write usage data exceeds a threshold multiple of standard deviations of a combination of the second write usage data and the third write usage data.

15. A storage usage management system, comprising:
a first storage device having a first write usage configuration;
a second storage device having a second write usage configuration that is different than the first write-usage configuration; and
a storage usage management subsystem that is coupled to the first storage device and the second storage device, wherein the storage usage management subsystem is configured to:
collect first write usage data for the first storage device that was generating in response to first write operations performed by a host that is mapped to the first storage device;
collect second write usage data for the first storage device that was generated in response to second write operations performed by the host;

determine that the second write usage data exceeds at least one first metric associated with the first write usage data by a first threshold;

collect, in response to determining that the second write usage data exceeds the at least one first metric associated with the first write usage data by the first threshold, third write usage data for the first storage device that was generated in response to third write operations performed by the host immediately subsequent to the second write operations;

determine whether the second write usage data and the third write usage data exceeds at least one second metric associated with the first write usage data by a second threshold;

determine, in response to determining that the second write usage data and the third write usage data do not exceed the at least one second metric associated with the first write usage data by the second threshold, whether the first write usage data, the second write usage data, and the third write usage data indicate that a first write usage threshold for the first write usage configuration has been exceeded;

remap, in response to determining that the first write usage data, the second write usage data, and the third write usage data indicate that the first write usage threshold for the first write usage configuration has been exceeded, the host from the first storage device to the second storage device.

16. The system of claim 15, wherein the storage usage management subsystem is configured to:

discard, in response to determining that the second write usage data and the third write usage data exceed the at least one second metric associated with the first write usage data by the second threshold, the second write usage data and the third write usage data.

17. The system of claim 15, wherein the storage usage management subsystem is configured to:

calculate a write amplification factor for the first storage device; and generate the first write usage data, the second write usage data, and the third write usage data for the first storage device using the write amplification factor.

18. The system of claim 15, wherein the determining that second write usage data exceeds the at least one first metric associated with the first write usage data by the first threshold includes:

determining that the second write usage data exceeds an average of the first write usage data by a threshold multiple of standard deviations of the first write usage data.

19. The system of claim 15, wherein the determining whether the second write usage data and the third write usage data exceeds the at least one second metric associated with the first write usage data by the second threshold includes:

determining whether a difference between a first average of the first write usage data and a second average of a combination of the second write usage data and the third write usage data exceeds a threshold multiple of standard deviations of the first write usage data.

20. The system of claim 15, wherein the determining whether the second write usage data and the third write usage data exceeds at least one second metric associated with the first write usage data by the second threshold includes:

determining whether a difference between a first average of the first write usage data and a second average of a combination of the second write usage data and the third write usage data exceeds a threshold multiple of standard deviations of a combination of the second write usage data and the third write usage data.

\* \* \* \* \*